(12) United States Patent
Ribbe et al.

(10) Patent No.: US 10,407,944 B2
(45) Date of Patent: Sep. 10, 2019

(54) MAGNETIC LOCK AND UTILITY CARTS INCLUDING SAME

(71) Applicant: Geerpres, Inc., Muskegon, MI (US)

(72) Inventors: Scott E. Ribbe, West Olive, MI (US); Ryan Schamper, Grand Haven, MI (US)

(73) Assignee: Geerpres, Inc., Muskegon, MI (US)

(*) Notice: Subject to any disclaimer, the term of this patent is extended or adjusted under 35 U.S.C. 154(b) by 453 days.

(21) Appl. No.: 15/173,501

(22) Filed: Jun. 3, 2016

(65) Prior Publication Data
US 2017/0350166 A1 Dec. 7, 2017

(51) Int. Cl.
| | |
|---|---|
| *E05B 65/44* | (2006.01) |
| *E05B 47/00* | (2006.01) |
| *E05B 9/02* | (2006.01) |
| *B62B 3/00* | (2006.01) |
| E05B 9/00 | (2006.01) |
| E05B 15/16 | (2006.01) |

(52) U.S. Cl.
CPC .............. *E05B 65/44* (2013.01); *B62B 3/004* (2013.01); *E05B 9/02* (2013.01); *E05B 47/004* (2013.01); *E05B 47/0045* (2013.01); *E05B 2009/004* (2013.01); *E05B 2015/1664* (2013.01)

(58) Field of Classification Search
CPC .............. Y10T 292/11; Y10T 70/7057; Y10T 70/7904; Y10T 24/32; E05B 47/004; E05B 47/0038; E05B 47/0045; E05B 15/0073; Y10S 403/01; Y10S 52/04; E05C 19/16; E05C 19/163
See application file for complete search history.

(56) References Cited

U.S. PATENT DOCUMENTS

| | | | | |
|---|---|---|---|---|
| 2,809,062 A | * | 10/1957 | Mainhardt | ............ E05B 47/004 292/144 |
| 3,641,793 A | * | 2/1972 | Van Dalen | .......... E05B 47/0044 70/276 |
| 3,744,833 A | * | 7/1973 | Berducone | .......... E05B 47/0038 292/251.5 |
| 3,782,147 A | * | 1/1974 | Hallmann | ........... E05B 47/0042 70/276 |
| 4,919,464 A | * | 4/1990 | Richards | ............. E05B 47/0038 292/201 |

(Continued)

*Primary Examiner* — Mark A Williams
(74) *Attorney, Agent, or Firm* — Mitchell Intellectual Property Law, PLLC

(57) ABSTRACT

A magnetic lock which requires only a single magnet for operation, yet which is biased into a locking position. A latch is slideably mounted in a slide way defined by a housing with a latch opening at one end. The latch comprises a magnet at its base, and a latch positioner of ferromagnetic material is positioned within the housing alongside the latch. The positioner is longer than the magnet, such that the magnetic field biases the magnet to locate at the center of the length of the latch positioner. The latch itself is sufficiently long that it projects beyond the latch opening of the housing when the magnet is allowed to center. The slide way is open below the magnet a sufficient distance that when a "key" of a ferromagnetic, or optionally magnetic, material, is located near the base of the housing, the magnet and its associated latch are drawn further into the housing a sufficient distance that the latch is drawn out of the way of an associated catch.

19 Claims, 7 Drawing Sheets

(56) References Cited

U.S. PATENT DOCUMENTS

| | | | | |
|---|---|---|---|---|
| 5,076,623 A | * | 12/1991 | Richards | E05B 47/0038 |
| | | | | 292/144 |
| 5,485,733 A | * | 1/1996 | Hoffman | E05B 47/004 |
| | | | | 292/251.5 |
| 8,166,836 B2 | * | 5/2012 | Rudduck | B25B 13/12 |
| | | | | 403/324 |
| 8,746,415 B2 | * | 6/2014 | Aluisetti | B66B 1/468 |
| | | | | 187/391 |
| 9,471,095 B2 | * | 10/2016 | Ho | G06F 1/16 |
| 2007/0113605 A1 | * | 5/2007 | Lopez | E05B 47/0044 |
| | | | | 70/276 |

* cited by examiner

MAGNETIC LOCK AND UTILITY CARTS INCLUDING SAME

FIELD OF THE INVENTION

The present invention relates in one aspect to magnetic locks and in another aspect to utility carts.

BACKGROUND

Utility carts, sometimes referred to as janitorial carts, are wheeled carts typically used by maintenance personnel to carry buckets, cleaning tools, cleaning chemicals and the like as they proceed with their cleaning rounds. Such carts often have a cabinet mounted on a wheeled base, with a lockable door which provides access to chemicals and tools kept inside the cabinet. Some include a "lock box" mounted on top of the cabinet which can similarly be used.

Particularly in hospital settings, it is important that cleaning chemicals and dangerous tools be kept locked up at all times, except when the maintenance person needs access to them. In such environments, it is often by regulation that the door or box must at all times be locked. Thus when a cleaning person enters a room to clean, he or she opens the box or cabinet to gain access to chemicals or tools needed for cleaning, but then must lock the door or box again while he or she is attending to the cleaning work. Often, the cleaning or maintenance person must unlock, open, close and re-lock the cabinet door or lock box several times during the ten or fifteen minutes he or she is in a room cleaning it.

U.S. Pat. No. 5,485,733 is exemplary of magnet latches which have been used to lock cabinet doors. Three magnets are employed in the locking system. A rotating latch comprises a magnet, and a separate "biasing" magnet is located nearby. The like poles of the two magnets are positioned adjacent one another, such that the rotating latch is biased into engagement with a catch, which prevents one from opening the cabinet door. A separate magnetic key is fitted with a third magnet, powerful enough to overcome the repulsion of the biasing magnet relative to the rotating latch. When the opposite pole more powerful key magnet is placed near the outside of the cabinet door, in the vicinity of the latch, it causes the latch to rotate to its open position, allowing the door to be opened. When the door is closed, the like pole of the biasing magnet causes the latch to rotate back into its locking position.

SUMMARY OF THE INVENTION

In the present invention, a magnetic lock is provided which requires only a single magnet for operation, yet which is biased into a locking position. The lock comprises a latch slideably mounted in a slide way defined by a housing with a latch opening at one end. The latch comprises a magnet at its base, and a latch positioner of ferromagnetic material is positioned within the housing alongside the latch. The positioner is longer than the magnet, such that the magnetic field biases the magnet to locate at the center of the length of the latch positioner. The latch itself is sufficiently long that it projects beyond the latch opening of the housing when the magnet is allowed to center. The slide way is open below the magnet a sufficient distance that when a "key" of a ferromagnetic, or optionally magnetic, material, is located near the base of the housing, the magnet and its associated latch are drawn further into the housing a sufficient distance that the latch is drawn out of the way of an associated catch.

One thus has an efficient latch which can be readily opened by positioning a ferromagnetic or magnetic key near the base of the lock, and which will be biased into a locked position when the "key" is moved away from the lock. Thus when the door is closed, the latch is biased into position engaging the catch. These and other objects, advantages and features of the invention will be more fully understood and appreciated by reference to the attached drawings and description of the preferred embodiments.

DESCRIPTION OF THE PREFERRED EMBODIMENTS

Figure 1:
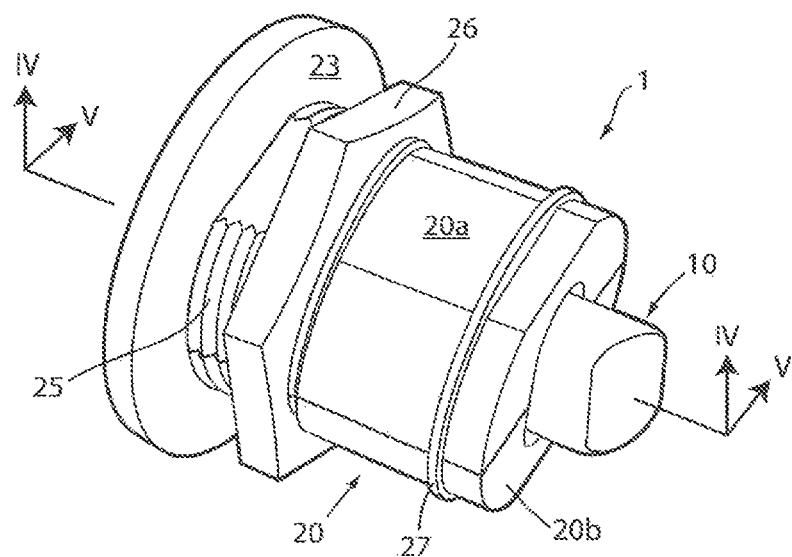
FIG. 1 is a perspective view of the lock with the latch extended.
Figure 2:
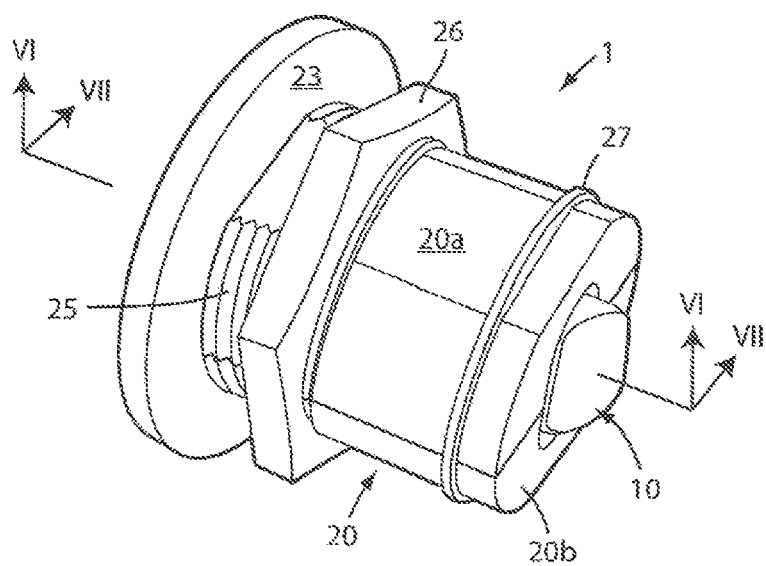
FIG. 2 is a perspective view of the lock with the latch retracted.
Figure 3:
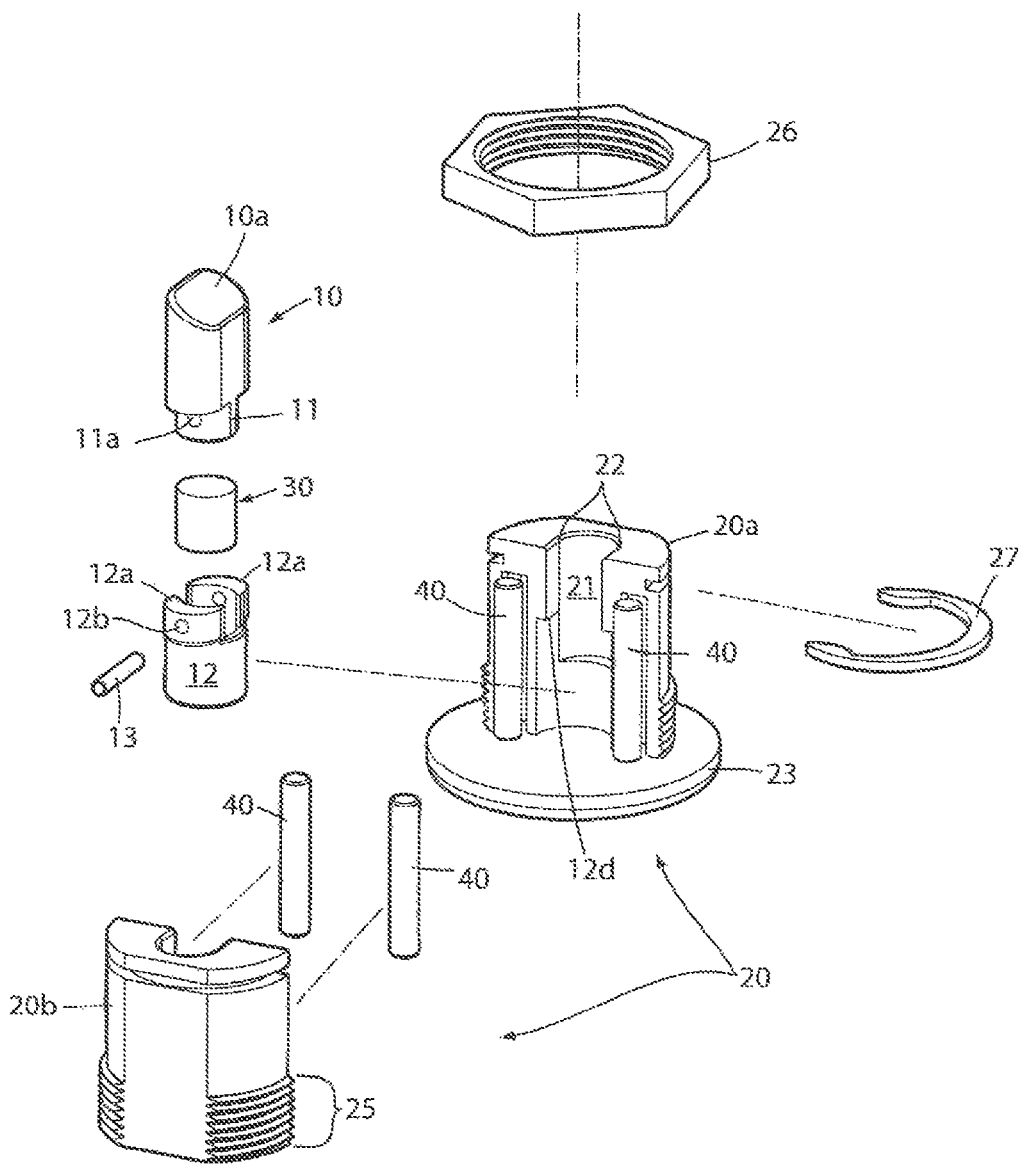
FIG. 3 is an exploded view of the lock.
Figure 4:
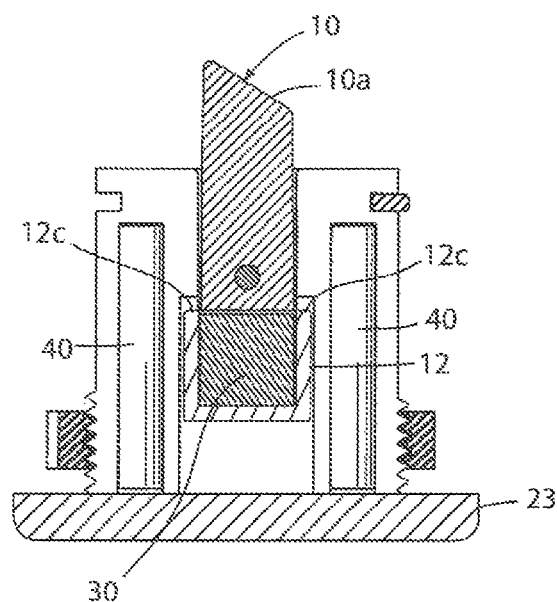
FIG. 4 is a cross section taken on plane IV-IV of FIG. 1.
Figure 5:
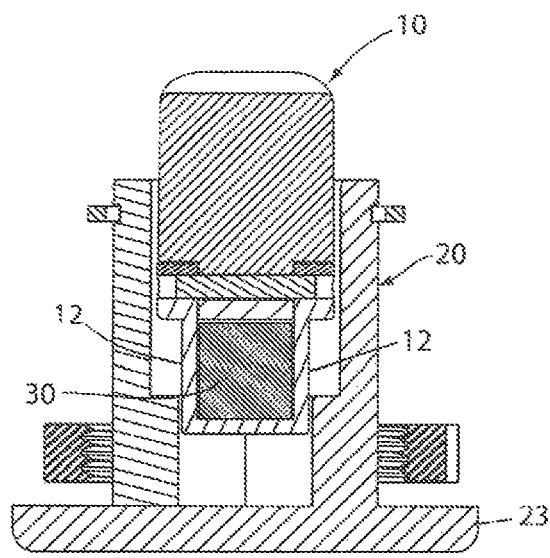
FIG. 5 is a cross section taken on plane V-V of FIG. 1.
Figure 9:
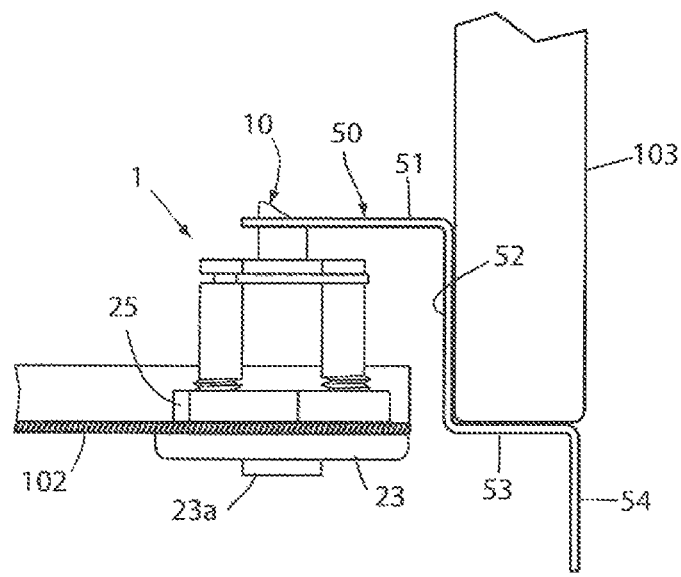
FIG. 9 is a fragmentary cross sectional view taken on plane IX-IX of FIG. 8.
Figure 10:
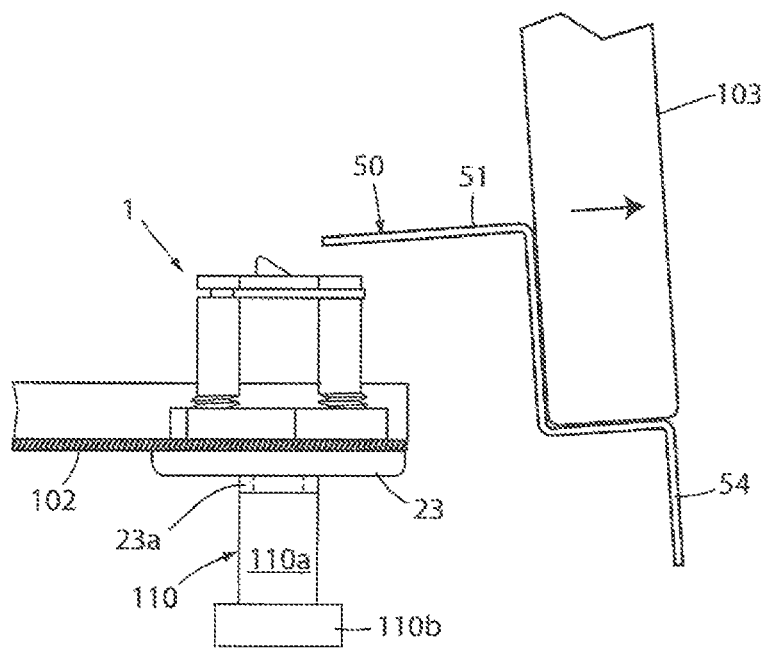
FIG. 10 is the same view as FIG. 9 with the "key" in position retracting the magnetic latch, and the cabinet door being opened.

In the preferred embodiments, magnetic lock 1 comprises a latch 10 slideably mounted in a slide way 21 defined by a housing 20, which is shown in two halves 20a and 20b in FIG. 3. (FIGS. 1-3) Slide way 21 includes a latch opening 22 at one end, through which latch 10 projects. Latch 10 is part of a latch assembly which includes a magnet 30 at its base. Four latch positioners of ferromagnetic material are positioned within housing 20 alongside latch 10. Latch positioners 40 are longer than magnet 30, such that the magnetic field of magnet 30 causes magnet 30 to tend to locate in the center of the length of latch positioners 40. Latch 10 is sufficiently long that it projects beyond latch opening 22 of housing 20 when magnet 30 is allowed to center (FIGS. 1, 4 and 5). Slide way 21 is open below the magnet a sufficient distance that when a "key" of a ferromagnetic, or optionally magnetic, material, is located near the base 23 of housing 20, magnet 30 and it associated latch 10 are drawn further into housing 20 (FIGS. 2, 6 and 7) a sufficient distance that latch 10 is drawn out of the way of an associated catch 50 (FIGS. 9 and 10).

PARTS LIST

1 lock
10 latch
10a sloping leading surface of latch 10
11 base stem of latch 10
11a lateral hole in base stem 11
12 magnet housing
12a connector tabs on magnet housing
12b lateral holes through connector tabs 12a
12c latch assembly shoulders 13 connector pin for joining magnet housing 12 to latch base stem 11
20 latch housing
20a and 20b latch housing halves
21 latch slide way
22 slide way opening 22
23 base of housing 20
23a key locater
24 shoulder stops
25 threaded portion
26 mounting nut
27 slip ring
30 magnet
40 magnet positioners
50 catch
51 catch flange
52 door mounting flange
53 door edge flange
54 door handle
100 utility cart
101 cabinet
102 cabinet walls
103 cabinet door
110 key Other than magnet 30 and magnet positioners 40, the other components of latch 1 are preferably made of non-magnetic or non-ferromagnetic material, so as to minimize interference with the magnetic field interaction of magnet 30 with positioners 40. Latch 10 is preferably made of stainless steel, and includes a sloping leading surface 10a at its end which projects out of housing 10. At its base, latch 10 includes a narrower base stem 11 having a hole 11a extending laterally there through. Magnet 30 is a part of the latch assembly, and is seated in a magnet housing 12, which is molded of nylon or other suitable plastic (FIG. 3). Magnet housing 12 is a barrel shape with a closed bottom, hollow interior for receiving magnet 30, circumferential sidewall and a pair of connector tabs 12a which project up from the top of housing 11 on either side thereof, and beyond the top of magnet 30 seated within magnet housing 12. Tabs 12a each have aligning openings 12b, through which a pin 13 can be pressed. Magnet housing 12, with magnet 30 inserted into it, is secured to base 11 of latch 10 by inserting base 11 into the space between connector tabs 12a, with hole 11a aligned with holes 12b in tabs 12a. Pin 13 is then inserted into holes 12b and 11a, to secure latch 10, magnet 30 and magnet housing 12 together as a single latch assembly unit.

Figure 6:
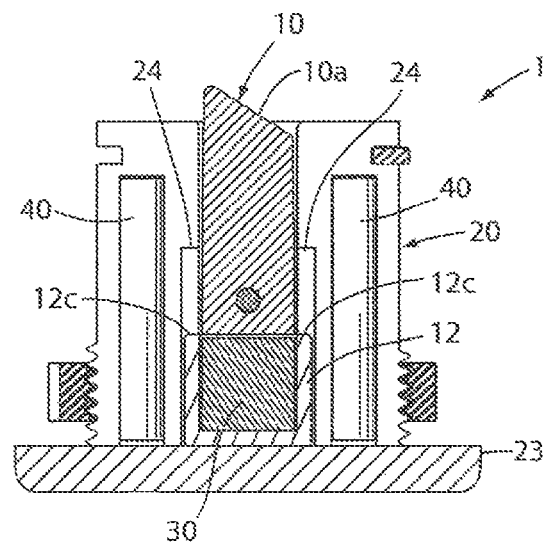
FIG. 6 is a cross section taken on plane VI-VI of FIG. 2.
Figure 7:
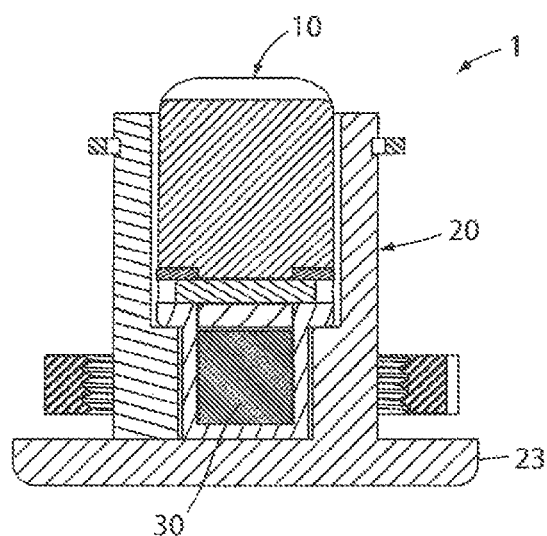
FIG. 7 is a cross section taken on plane VII-VII of FIG. 2.

Latch 10 is wider in one lateral direction than the one 90° to it. Magnet 30 and magnet housing 12, on the other hand are circular in cross section. Consequently, the upper edge of magnet housing 12 defines shoulders 12c which extend outwardly beyond the narrow width dimension of latch 10 on either side of it (FIGS. 4 and 6). Slide way 21 in latch housing 20 is narrower in its top portion (as viewed in the drawings) where it embraces the front and back sides of the narrow dimension of latch 10, and defines shoulder stops 24, which engage shoulders 12c as latch 10 is extended, thus preventing latch 10, magnet 30 and magnet housing 12 from separating from latch housing 20 (FIGS. 6 and 4).

Latch housing 20 is preferably made of a durable plastic. It is comprised of two halves, 20a and 20b. Housing half 20a includes base plate 23 which serves as the base plate for the entire assembled housing 20. The portions of housing halves 20a and 20b which project from base plate 23 are generally barrel shaped when assembled together, comprising a perimeter wall which encloses slide way 21. Each housing half 20a and 20b thus defines half of slide way 21, and is configured to slideably accommodate latch 10 and magnet housing 12 (with magnet 30 therein) within slide way 20 (FIGS. 4-7). Each latch housing half 20a and 20b includes a pair of elongated recesses (un-numbered) in the interior facing surfaces thereof, into which magnet positioners 40 are inserted (FIG. 3). Thus latch housing 20 accommodates four magnet positioners 40 within its assembled perimeter wall, two on either side of slide way 21, and thus on either side of magnet 30 (FIG. 3).

The exterior of the upstanding barrel shaped portion of latch housing 20 is threaded with threads 25 (FIG. 3), onto which a mounting nut 26 is threaded. Mounting nut not only helps hold housing halves 20a and 20b together, it also secures lock 1 to a cabinet wall, with base plate 23 on the outside of the cabinet wall and mounting nut 25 threaded up against the other side of the cabinet wall (FIGS. 1-3). The upper portions of housing halves 20a and 20b include a perimeter groove which accommodates a slip ring 27. Slip ring 27 further holds housing halves 20a and 20b assembled together. Nut 26 and slip ring 27 are preferably made of a non-ferromagnetic material to avoid interference with the magnetic interaction of magnet positioners 40 and magnet 30.

Magnet positioners 40 each comprise an elongated rod of steel or other ferromagnetic material. Each is sufficiently narrow to fit within a recess in the facing surfaces of housing halves 20a and 20b. Each positioner 40 is longer than magnet 30, such that the magnetic field of magnet 30 causes the magnet to tend to locate in the center of the length of latch positioners 40. Latch 10 is sufficiently long that it projects beyond the latch opening 22 of housing 21 when magnet 30 is allowed to center. The slide way is open below the magnet a sufficient distance that when a "key" 110 (FIG. 10) of a ferromagnetic, or optionally magnetic, material, is located near base 23 of housing 20, magnet 30 and its associated latch are drawn further into housing 20a sufficient distance that the latch is drawn out of the way of an associated catch 50. (Compare FIGS. 4 and 5, FIGS. 6 and 7, and FIGS. 9 and 10.)

Figure 8:
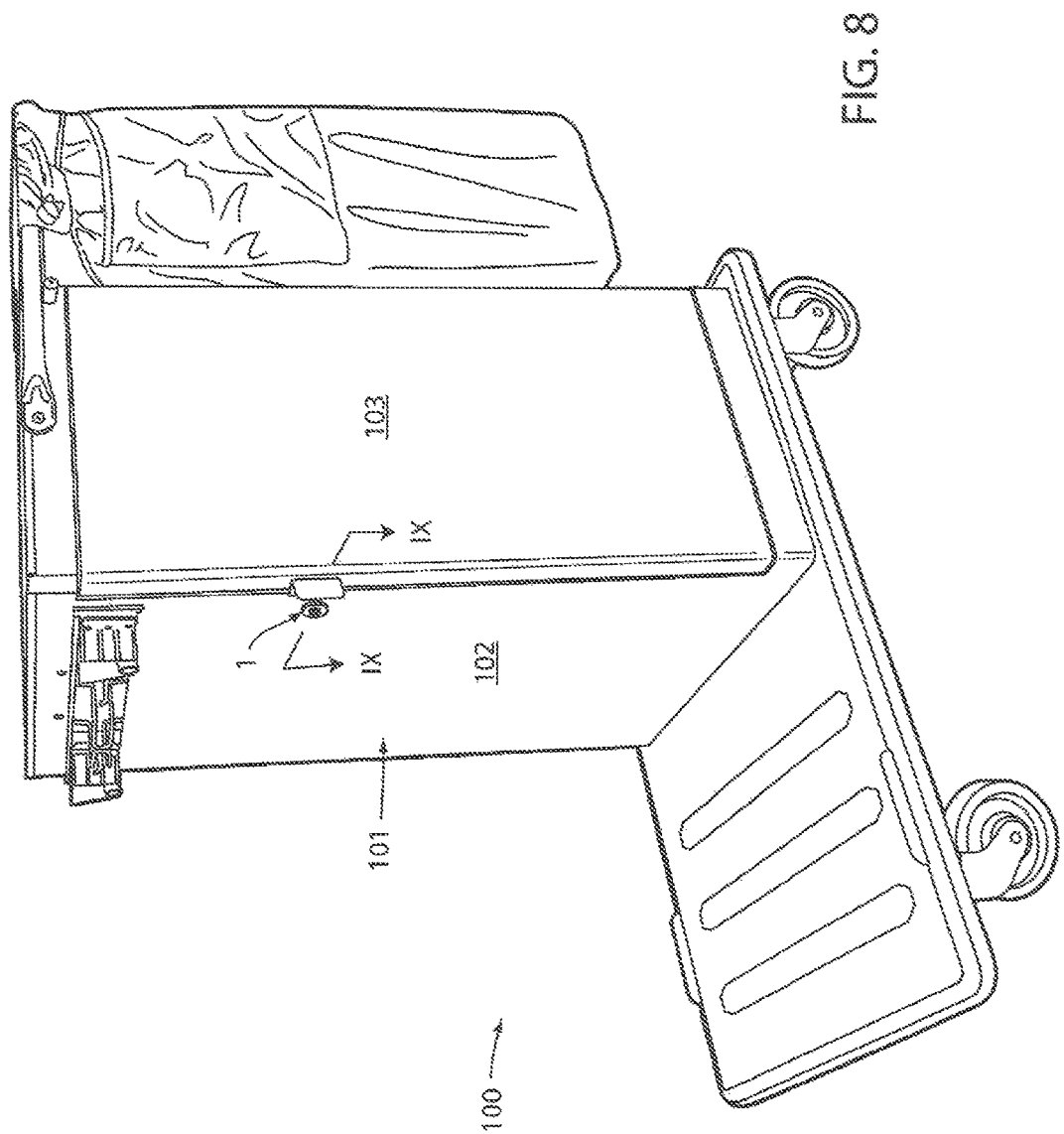
FIG. 8 is a perspective view of a utility cart with door closed and locked.

FIG. 8 shows a utility cart 100 having a cabinet 101 mounted thereon. Cabinet 101 includes walls 102 and a door 103 which can be opened and closed, and which can be locked by lock 1. Lock 1 is mounted on wall 102 with base plate 123 located on the outside of wall 102, the barrel portion of latch housing 20 extending through a hole in wall 102, and mounting nut 25 threaded down against the interior of wall 102 (FIG. 9). Latch 10 is in its extended position engages a catch 50 mounted on the inside of cabinet door 103. Catch 50 comprises a flange 51 with an opening therein for receiving latch 10. Flange 51 is bent out from a base 52 which is secured to the inside of door 102, and wraps around the edge of door 103 at 53, and is then bent out to define a door handle 54. (FIGS. 9-11).

When a "key" 110 of magnetic or ferromagnetic material is placed adjacent latch housing base plate 23, latch 10 is withdrawn into latch housing 20, allowing one to open door 103, as shown in FIG. 10. Key 110 can be any object of ferromagnetic material. As shown in FIG. 10, it is a tubular sleeve or rod 110a, with a head 110b. Base plate 23 of latch housing 20 includes an optional key locater 23a thereon, over or into which key 110 can be positioned. However, this is not essential, as simply placing a key of ferromagnetic material near base plate 23 will cause magnet 30 to be drawn toward base plate 23 in the manner shown in FIG. 10.

Figure 11:
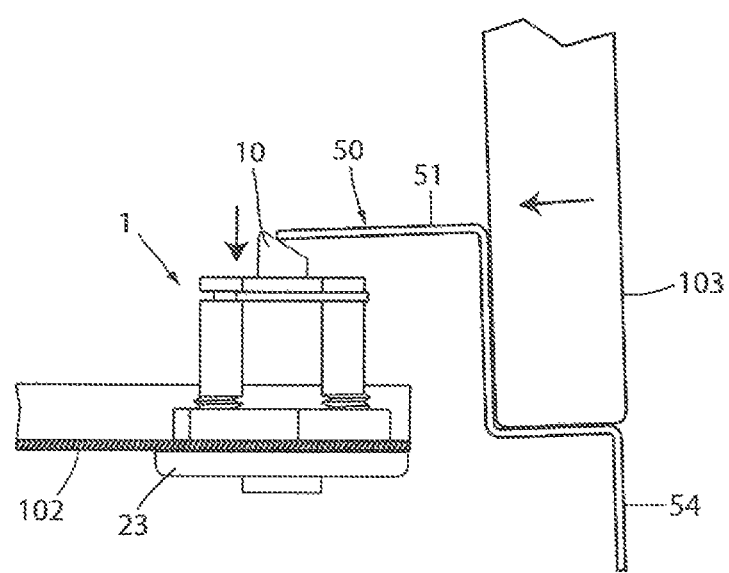
FIG. 11 is the same view as FIG. 9 with the "key" removed and the cabinet door closing.

When key 110 is withdrawn, latch 10 will return to its centered position relative to positioners 40, as shown in FIG. 11. Door 103 can then be closed, with catch 50 sliding past the tip of latch 10 as shown in FIG. 11, pushing latch 10 out of the way until the catch opening in catch 50 is positioned over latch 10, and latch 10 centers again in engagement with catch 50 as shown in FIG. 9.

Magnetic lock 1 could also be used on a small cabinet mounted on top of cabinet 101 of utility cart 100. Such cabinets may include other types of doors, such ads tambour doors or other types of rotating open doors. The lock and latch arrangement could be similar to that shown in FIGS. 9-11.

Thus, one thus has an efficient latch which can be readily opened by positioning a ferromagnetic or magnetic key near the base of the lock, and which will be biased into a locked position when the "key" is moved away from the lock. Thus when the door is closed, the latch is biased into position engaging the catch. Of course, it is understood that the forgoing are preferred embodiments of the invention, and various changes and alterations can be made without departing from the spirit and broader aspects thereof as set forth in the appended claims.

The invention claimed is:

1. A magnetic lock comprising: a latch assembly including a latch extending from a base to an end portion, and a magnet attached to said base of said latch; a housing for said latch assembly, said housing defining a slide way, said latch assembly being slideably positioned in said slide way of said housing; said slideway having a latch opening through which said end portion of said latch can project; at least one latch positioner of ferromagnetic material positioned within said housing alongside said latch assembly; said positioner being longer than said magnet, such that the magnetic field of said magnet biases said magnet to locate along the center of the length of said latch positioner; said latch being sufficiently long that it projects beyond said latch opening of said housing slideway when said magnet is allowed to locate along the center of the length of said latch positioner; said slide way being open below said magnet a sufficient distance that when a "key" of a ferromagnetic, or optionally magnetic material, is located near said base of said housing, said magnet and its said latch are drawn further into said housing a sufficient distance that said latch is drawn out of the way of a catch with which it may be associated.

2. The magnetic lock of claim 1 comprising: at least two of said latch positioners positioned within said housing alongside said latch assembly, on opposite sides of said magnet from one another.

3. The magnetic lock of claim 2 in which: said end portion of said latch comprises a sloping surface, such that as said lock passes from an unlocked to a locked position with respect to an associated catch, said catch will engage said sloping surface and push said latch aside against the bias of the magnetic field of said magnet, until said latch passes said catch and is biased by said magnet back into its position along the center of said magnet positioner, and into engagement with said catch.

4. The magnetic lock of claim 3 comprising: said housing comprising two parts, one connected to said base; each part including a portion of a perimeter wall, said perimeter wall portions including mating wall ends which come together facing each other when said housing parts are joined; at least two of said wall ends including at least one recess therein for receiving at least one of said magnet positioners, whereby said magnet positioners become encased within said perimeter wall, on opposite sides of said magnet.

5. The magnetic lock of claim 4 comprising: each of said end walls including a recess therein for receiving one of said latch positioners, whereby there are four recesses in said housing when said housing parts are joined: there being four of said latch positioners, one of said latch positioners being located within each of said four recesses.

6. The magnetic lock of claim 4 comprising: said latch including a narrower base stem having a hole extending laterally there through; a magnet housing for receiving said magnet; said magnet housing including spaced connector tabs which project up from the top of said magnet housing on either side said base stem of said latch; said tabs each have aligning openings which also align with said hole in said base stem, such that said magnet housing, with said magnet inserted into it, is secured to said base stem of said latch, by inserting base into the space between said connector tabs, with said hole in said base stem aligned with said holes in said tabs; a pin being inserted through said holes, to secure said latch, magnet and magnet housing together as a single latch assembly unit.

7. The magnetic lock of claim 6 comprising: said latch being narrower in one lateral direction than the lateral direction 90° to it; said magnet housing being wider in cross section than said narrower dimension of said latch, such that said magnet housing defines shoulders which extend outwardly beyond said narrow width dimension of said latch 10 on either side thereof; said slide way in said latch housing being narrower in its top portion where it embraces said narrow dimension of said latch and defines shoulder stops which engage said shoulders on said magnet housing as said latch is extended, thus preventing said latch, said magnet and said magnet housing from separating from latch housing.

8. The magnetic lock of claim 1 comprising: said latch including a narrower base stem having a hole extending laterally there through; a magnet housing for receiving said magnet; said magnet housing including spaced connector tabs which project up from the top of said magnet housing on either side said base stem of said latch; said tabs each have aligning openings which also align with said hole in said base stem, such that said magnet housing, with said magnet inserted into it, is secured to said base stem of said latch, by inserting base into the space between said connector tabs, with said hole in said base stem aligned with said holes in said tabs; a pin being inserted through said holes, to secure said latch, magnet and magnet housing together as a single latch assembly unit.

9. The magnetic lock of claim 8 comprising: said latch being narrower in one lateral direction than the lateral direction 90° to it; said magnet housing being wider in cross section than said narrower dimension of said latch, such that said magnet housing defines shoulders which extend outwardly beyond said narrow width dimension of said latch 10 on either side thereof; said slide way in said latch housing being narrower in its top portion where it embraces said narrow dimension of said latch and defines shoulder stops which engage said shoulders on said magnet housing as said latch is extended, thus preventing said latch, said magnet and said magnet housing from separating from latch housing.

10. A utility cart comprising: a cabinet having walls and a door; said cabinet including a magnetic latch for said door, there being a catch on one of said door and said wall adjacent said door; a magnetic lock located in the other of said door and said wall adjacent said door, said magnetic lock comprising: a latch assembly including a latch extending from a base to an end portion, and a magnet attached to said base of said latch; a housing for said latch assembly, said housing defining a slide way, said latch assembly being slideably positioned in said slide way of said housing; said slideway having a latch opening through which said end portion of said latch can project; at least one latch positioner of ferromagnetic material positioned within said housing alongside said latch assembly; said positioner being longer than said magnet, such that the magnetic field of said magnet biases said magnet to locate along the center of the length of said latch positioner; said latch being sufficiently long that it projects beyond said latch opening of said housing slideway when said magnet is allowed to locate along the center of the length of said latch positioner, and into engagement with said catch; said slide way being open below said magnet a sufficient distance that when a "key" of a ferromagnetic, or optionally magnetic material, is located near said base of said housing, said magnet and its said latch are drawn further into said housing a sufficient distance that said latch is drawn out of the way of said catch.

11. The utility cart of claim 10 in which said catch is located on said door and said lock is located on said wall of said cabinet adjacent said door and said catch.

12. The utility cart of claim 10 comprising: said magnetic lock including at least two of said latch positioners, being located on opposite sides of said magnet from one another.

13. The utility cart of claim 12 comprising: said magnetic lock including said end portion of said latch comprising a sloping surface, such that as said lock passes from an unlocked to a locked position with respect to an associated catch, said catch will engage said sloping surface and push said latch aside against the bias of the magnetic field of said magnet, until said latch passes said catch and is biased by said magnet back into its position along the center of said magnet positioner, and into engagement with said catch.

14. The utility cart of claim 13 comprising: said magnetic lock including said housing comprising two parts, one connected to said base; each part including a portion of a perimeter wall, said perimeter wall portions including mating wall ends which come together facing each other when said housing parts are joined; at least two of said wall ends including at least one recess therein for receiving at least one of said magnet positioners, whereby said magnet positioners become encased within said perimeter wall, on opposite sides of said magnet.

15. The utility cart of claim 14 comprising: said magnetic lock including four of said magnet positioners, each of said mating wall ends including a recess therein, whereby one of said magnet positioners is located within each of said four recesses.

16. The utility cart of claim 14 comprising: said magnetic lock including said latch having a narrower base stem having a hole extending laterally there through; a magnet housing for receiving said magnet; said magnet housing including spaced connector tabs which project up from the top of said magnet housing on either side said base stem of said latch; said tabs each have aligning openings which also align with said hole in said base stem, such that said magnet housing, with said magnet inserted into it, is secured to said base stem of said latch, by inserting base into the space between said connector tabs, with said hole in said base stem aligned with said holes in said tabs; a pin being inserted through said holes, to secure said latch, magnet and magnet housing together as a single latch assembly unit.

17. The utility cart of claim 16 comprising: said magnetic lock including said latch being narrower in one lateral direction than the lateral direction 90° to it; said magnet housing being wider in cross section than said narrower dimension of said latch, such that said magnet housing defines shoulders which extend outwardly beyond said narrow width dimension of said latch 10 on either side thereof; said slide way in said latch housing being narrower in its top portion where it embraces said narrow dimension of said latch and defines shoulder stops which engage said shoulders on said magnet housing as said latch is extended, thus preventing said latch, said magnet and said magnet housing from separating from latch housing.

18. The utility cart of claim 10 comprising: said magnetic lock including said latch having a narrower base stem having a hole extending laterally there through; a magnet housing for receiving said magnet; said magnet housing including spaced connector tabs which project up from the top of said magnet housing on either side said base stem of said latch; said tabs each have aligning openings which also align with said hole in said base stem, such that said magnet housing, with said magnet inserted into it, is secured to said base stem of said latch, by inserting base into the space between said connector tabs, with said hole in said base stem aligned with said holes in said tabs; a pin being inserted through said holes, to secure said latch, magnet and magnet housing together as a single latch assembly unit.

19. The utility cart of claim 18 comprising: said magnetic lock including said latch being narrower in one lateral direction than the lateral direction 90° to it; said magnet housing being wider in cross section than said narrower dimension of said latch, such that said magnet housing defines shoulders which extend outwardly beyond said narrow width dimension of said latch 10 on either side thereof; said slide way in said latch housing being narrower in its top portion where it embraces said narrow dimension of said latch and defines shoulder stops which engage said shoulders on said magnet housing as said latch is extended, thus preventing said latch, said magnet and said magnet housing from separating from latch housing.

\* \* \* \* \*